United States Patent [19]

Tianello et al.

[11] Patent Number: 5,450,160
[45] Date of Patent: Sep. 12, 1995

[54] FILM CARTRIDGE MAGAZINE

[75] Inventors: Dennis F. Tianello, Spencerport; Alfonso Ianni, Rochester; John A. Romansky, Hilton; Gerald F. Sherman, Jr., LeRoy; William T. Matthias; Ralph E. Williams, both of Rochester, all of N.Y.

[73] Assignee: Eastman Kodak Company, Rochester, N.Y.

[21] Appl. No.: 172,013

[22] Filed: Dec. 22, 1993

[51] Int. Cl.⁶ .................................................. G03B 13/10
[52] U.S. Cl. ..................................... 354/354; 221/76; 221/82
[58] Field of Search ............... 354/275, 319, 297, 354, 354/340; 364/513, 525, 526; 242/180, 67.3; 355/40, 41, 75; 221/75, 76, 81, 82, 86, 87, 91

[56] References Cited

U.S. PATENT DOCUMENTS

| | | | |
|---|---|---|---|
| 1,125,653 | 1/1915 | Clark . | |
| 3,753,486 | 8/1973 | Vogt et al. | 198/131 |
| 3,851,957 | 12/1974 | Anderson | 352/123 |
| 3,868,018 | 2/1975 | Theis | 211/40 |
| 4,036,418 | 7/1977 | Chiebda | 224/48 F |
| 4,498,603 | 2/1985 | Wittenborg | 221/76 |
| 4,693,373 | 9/1987 | Lamb et al. | 353/113 |
| 4,817,023 | 3/1989 | Yamaguchi et al. | 364/525 |
| 4,839,505 | 6/1989 | Bradt et al. | 364/479 |
| 4,928,245 | 5/1990 | Moy et al. | 364/513 |
| 4,938,586 | 7/1990 | Hirose | 353/26 |
| 5,032,707 | 7/1991 | Gudmundson et al. | 235/375 |
| 5,176,285 | 1/1993 | Shaw | 221/3 |
| 5,212,512 | 5/1993 | Shiota | 354/319 |
| 5,229,802 | 7/1993 | Shiota et al. | 354/275 |
| 5,231,439 | 7/1993 | Takahashj et al. | 354/313 |
| 5,325,144 | 6/1994 | Yoshikawa et al. | 354/319 |
| 5,347,338 | 9/1994 | Weibel | 354/340 |

OTHER PUBLICATIONS

Rapid Random Access Retrieval Apparatus by R. J. Roman, Research Disclosure, Nov. 1982, pp. 366, 367.

Primary Examiner—D. Rutledge
Attorney, Agent, or Firm—Peter J. Bilinski

[57] ABSTRACT

A cartridge magazine is provided including a plurality of sleeves, each defining a pocket for containing a film cartridge, and a hub supporting the sleeves parallel to one another in a ring. Each sleeve defines a non-circular cross-section accommodating longitudinal movement of the cartridges through the sleeve, but blocking rotational movement of the cartridges in the sleeve. The sleeve, is open along one side, defining a slot for accessing cartridges from the exterior of the magazine. In certain applications, film in selected cartridges is advanced from the cartridge and through the slot without removing the cartridge from the magazine. According to other features, duplicate sections of the magazine are combined with the sleeves arranged in columns for increased capacity.

22 Claims, 5 Drawing Sheets

FILM CARTRIDGE MAGAZINE

CROSS-REFERENCE TO RELATED APPLICATIONS

Reference is made to commonly assigned copending U.S. patent application Ser. No. 08/171,582, Entitled Film Processing System, and filed on even date herewith in the names of Francis C. Long and Walter C. Slater, the disclosure of which hereby is incorporated into the present specification.

BACKGROUND OF THE INVENTION

1. Field of Invention

The invention relates to magazines for use in photography to contain and facilitate the handling of a plurality of film cartridges.

2. Description of the Prior Art

In a typical photofinishing operation, film rolls are accumulated, sorted and removed from their containing cartridges for processing. The cartridges are cracked open to release the film, and discarded at a very early stage in the operation. During their short life the cartridges are handled in bins, totes and conveyers for isolating batches of film according to the required processing parameters.

Although the film cartridge often does not last long in a processing facility, cartridge magazines have been employed to facilitate their handling. Gudmundson et al. U.S. Pat. No. 5,032,707, issued Jul. 16, 1991, discloses one example that includes a film magazine for maintaining sorted film in transportable batches. Their magazine is a rectangular tube open at one end with a slot along one side.

Photographic processes have been proposed in which the film is retained in its cartridge throughout the processing operation, or is returned to a similar cartridge after film processing. The cartridges typically are handled by conveyers, or, again, in rectangular tubes. One approach is presented in Takahashi et al. U.S. Pat. No. 5,231,439, issued Jul. 27, 1993. Takahasi et al. use rectangular tubes, including escape mechanisms, for containing and dispensing the film cartridges.

Of course photographic slides have been handled in carousel magazines for many years. A similar approach is presented in Yamaguchi et al. U.S. Pat. No. 4,817,023, issued Mar. 28, 1989. They disclose a cylindrical magazine for handling photographic slides in a printing operation.

PROBLEM SOLVED BY THE INVENTION

Prior art proposals have not adequately addressed the requirements for handling film and film cartridges during and after photographic processing.

The present invention has many different applications, and the problems solved differ depending on the application. In general, however, prior art approaches lack the flexibility of a single structure that provides for many different functions, alternatively or in combination, for handling either a few cartridges, or many, either manually, or in automated equipment.

SUMMARY OF THE INVENTION

The present invention is directed to a cartridge magazine suitable for use in many different applications employing its advantageous features alternatively or in combination. Briefly summarized, according to one aspect of the invention, a cartridge magazine is provided with a plurality of interconnected sleeves, each defining a pocket for holding a film cartridge, and a hub supporting the sleeves parallel to one another in a ring. The sleeves are open at both ends for receiving and dispensing the cartrides.

According to more specific features, each sleeve defines a non-circular cross-section accommodating longitudinal movement of the cartridges through the sleeves, but blocking rotational movement of the cartridges in the sleeves. Still more specifically, the sleeves are defined by thin walls including an opening along one side facing away from the hub for accessing cartridges from the exterior of the magazine. In certain applications, film is contained in the cartridges and is advanced therefrom through the opening in the sleeve without removing the cartridge from the magazine.

According to other features, the magazine includes a gate at one or both ends of the sleeve. The gate moves between a blocking position extending over the passageway and a retracted position opening the passageway. The gates are operated selectively to open individual sleeves from either or both ends.

The magazine is constructed of sections that can be combined with other similar sections to increase its capacity. The sleeves are then stacked in multiple rows that are aligned to define columns. Interlocking surfaces and latches secure the sections together.

ADVANTAGEOUS EFFECTS OF THE INVENTION

According to one application of the invention, film cartridges are located and oriented by the magazine so their presentation is predetermined and repeatable. The magazine holds the cartridges equally spaced in a ring about an axis of rotation and is particularly convenient for indexing the cartridges relative to a fixed station. Apparatus controlling the magazine can present the cartridges in sequence or random order.

In the same configuration, a magazine according to the invention might be used for containing a plurality of film cartridges for transportation or storage and later retrieval. The cartridges are visible through the magazine for identification and any desired cartridge can be loaded and removed in sequential or random order by automated equipment or by hand.

In another application of the invention, several similar magazines are stacked in an assembly of magazines to increase capacity and add another dimension. In this application the cartridges are aligned in rows and columns, and easily can be indexed to dispense the cartridges by row or column. This configuration is particularly useful for maintaining and dispensing the cartridges in a predetermined sequence, either forward or in reverse.

In still other applications, the cartridges contain film and remain in the magazine while the film is pulled or expelled from one or more of the cartridges through openings in the magazine. According to a particularly advantageous feature associated with this application, the magazine provides initial positioning of the cartridges in the equipment, but the equipment then engages the cartridge to determine its final position. This feature is facilitated by providing some play between the cartridges and magazine surfaces.

The magazine preferably is transparent, at least adjacent the cartridge exit, and markings on the cartridge are visible for manual or machine reading without requiring their removal from the magazine.

The flexibility of the magazine, and its many resulting applications, increases the number of magazines that will be employed, reducing manufacturing and other volume related costs.

These and other features and advantages of the invention will be more clearly understood and appreciated from a review of the following detailed description of the preferred embodiments and appended claims, and be reference to the accompanying drawings.

DESCRIPTION OF THE REFERRED EMBODIMENTS

Figure 1:
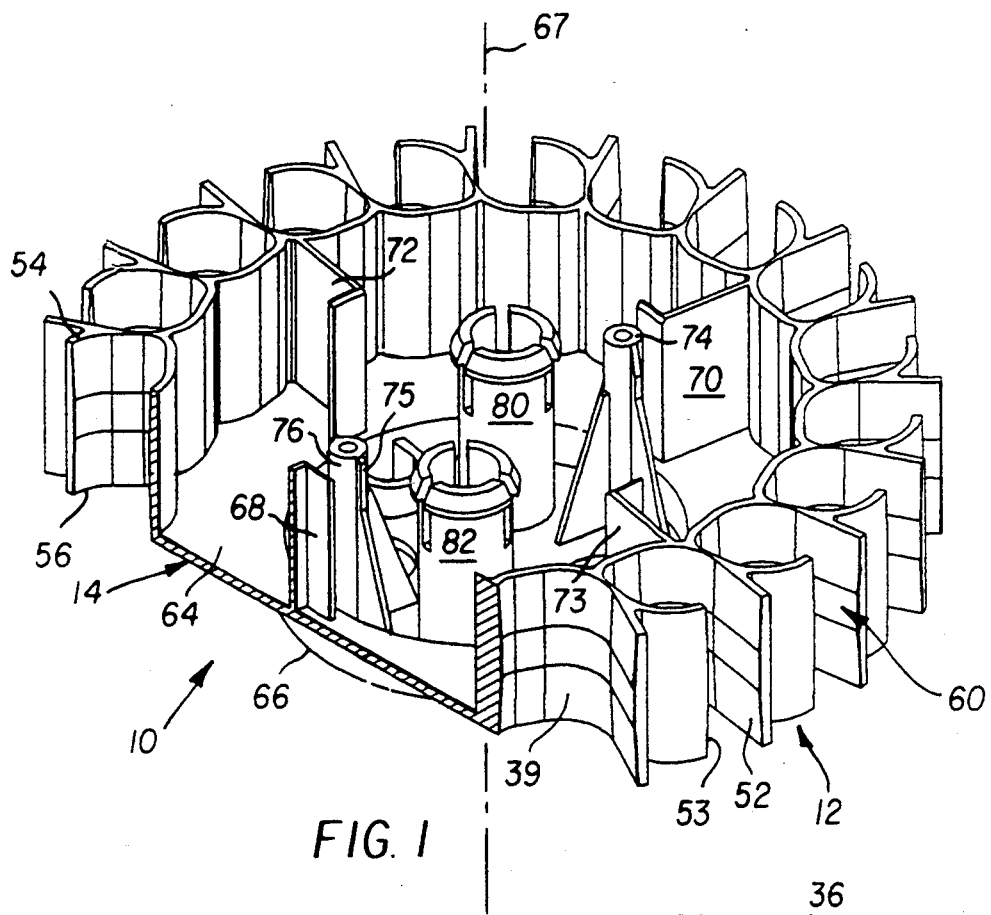
FIG. 1 is a perspective view of a cartridge magazine in accordance with the invention, with the ends removed and portions broken away to illustrate the internal structure.
Figure 3:
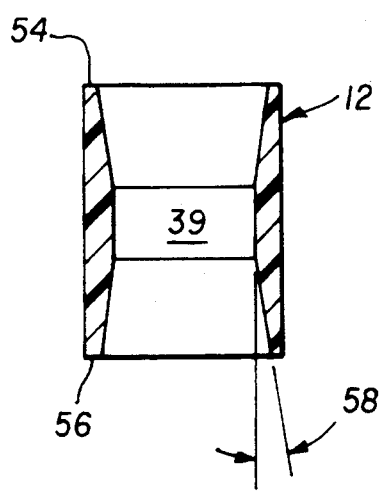
FIG. 3 is a side sectional view of one of the sleeves showing its vertical cross-section.
Figure 2:
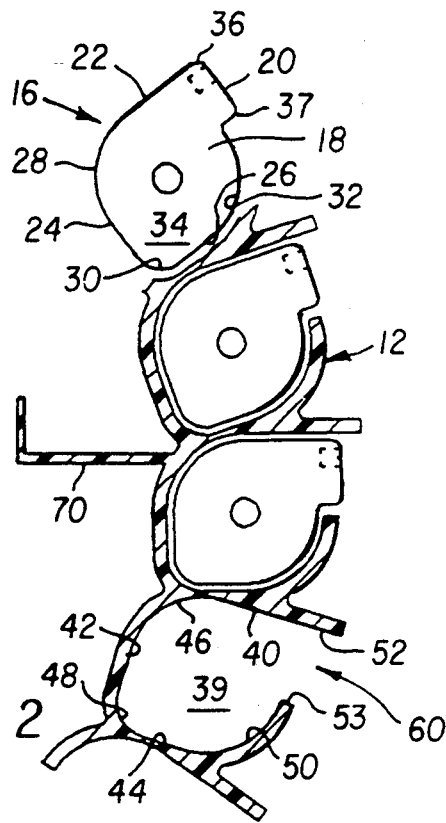
FIG. 2 is a top sectional view of several sleeves showing the horizontal cross-section of the sleeves with film cartridges contained therein.

Referring now to FIGS. 1-3, and a preferred embodiment of the invention, a section 10 of a cartridge magazine is depicted including a plurality of sleeves 12 supported on a core 14.

Each sleeve is adapted to accommodate a film cartridge 16 (FIG. 2), including a flattened cylindrical body 18 and snout 20. The body is bounded by substantially straight walls 22, 24 and 26, interconnected by arcuate sections 28, 30 and 32, that extend longitudinally between opposed flat ends 34 (only one is shown). The snout 20 includes projections 36 and 37 that define a film conduit therebetween extending approximately tangentially from the cartridge body 18. The cartridge 16 thus has a substantially uniform but non-circular cross-section and resembles a partly flattened right cylinder with a short snout extending therefrom. The cartridge body 18 is adapted for containing a roll of photographic film on a spool. In use, the film is extended from and retracted back into the body 18 through the conduit. In some applications the film is removed completely from the cartridge. In other applications the film remains attached to the spool.

The sleeves 12 are adapted to receive and contain the cartridges aligned in predetermined positions and orientations relative to the rest of the magazine. Each sleeve 12 includes a flattened cylindrical pocket 39 bounded by substantially straight walls 40, 42 and 44, connected by arcuate sections 46, 48 and 50, corresponding to the straight walls and arcuate sections of the cartridge. A projection 52 extends from wall 40 to capture the cartridge snout 20 between the projection and an opposed abutment 53. The sleeves thus define non-circular passageways, open at both ends, suitable for longitudinal movement of the cartridges entering the sleeves at one end 54 (FIG. 1) and exiting at the same or opposite ends 56. The sleeve 12 also defines a cross-section that corresponds to the cross-section of the cartridge, but includes draft angles 58 (FIG. 3) at both ends to reduce the possibility of jamming or binding during loading of the cartridges into the sleeve and dispensing of the cartridges from the sleeve. Although similar to the cartridge 16 in cross-section, there is some play between the cartridge and sleeve, particularly for certain applications to be described.

Sleeves 16 are defined by an interconnected thin wall structure having a thickness of approximately one sixteenth to one eighth of an inch (1/16-⅛ inches) formed into a cup-like configuration that surrounds the film cartridge in close proximity thereto.

The sleeves are open along one side at a slot 60, between projection 52 and abutment 53, for accommodating the cartridge snout 20 and providing access through the sleeve to the film conduit. Such access is available in both directions, for acting on the cartridges from the exterior of the magazine, and, in certain applications, for extending film from the cartridges while they are still in the sleeve.

The magazine core 14 includes a web 64, similar in thickness to the sleeve walls, that supports the sleeves 12 parallel to one another in a circle or ring with the open or slotted side 60 of each sleeve 12 facing away from the center of the ring. An outer hub 66, extends from the web and defines a longitudinal axis 67 at its center. The hub 66 is in the shape of a disk, and is displaced out of the plane of the web 64 in the center of the sleeve ring.

Figure 4:
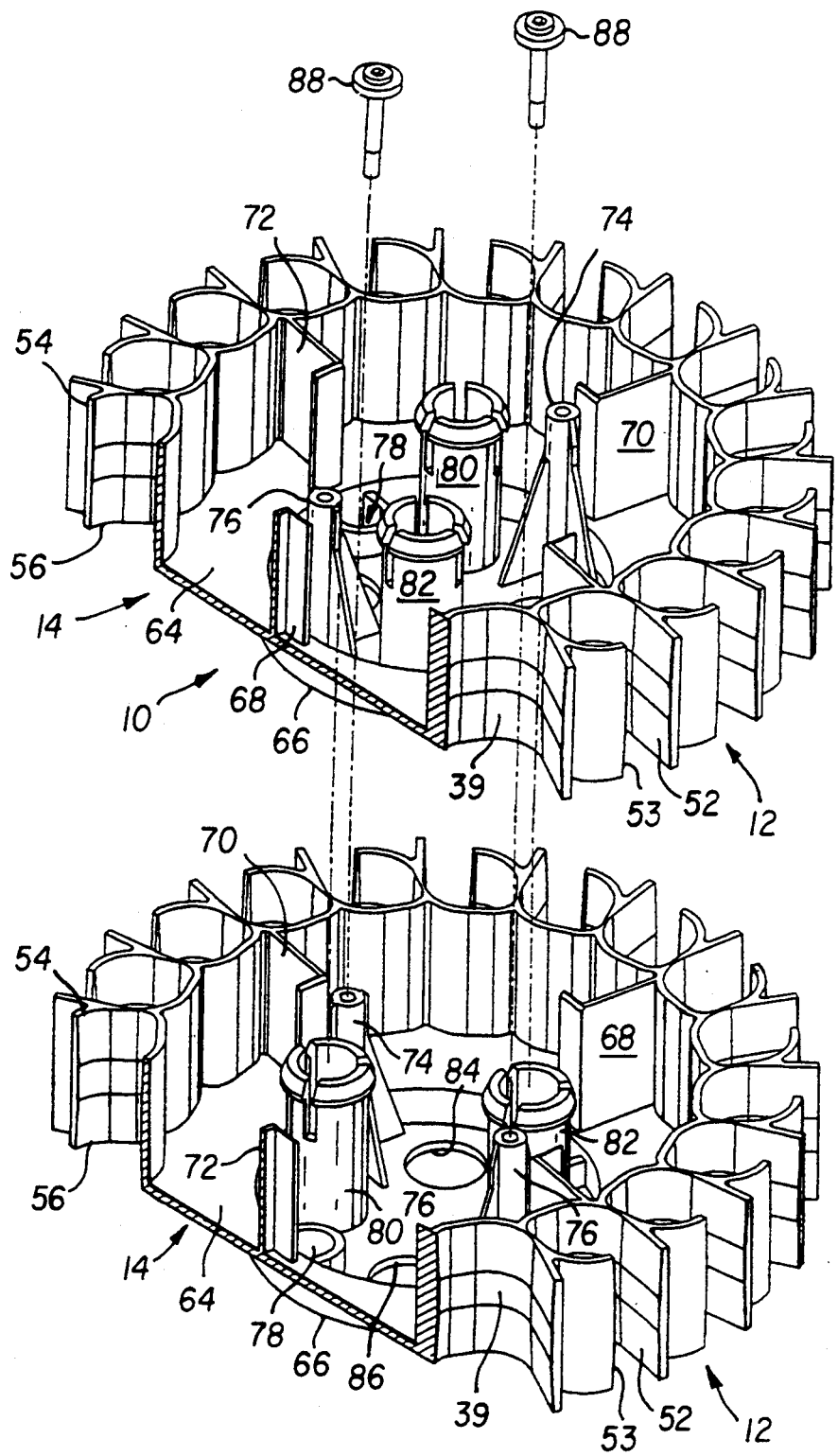
FIG. 4 is an exploded view of two magazine sections adapted to be combined with end caps, depicted elsewhere, to increase the magazine capacity.
Figure 9:
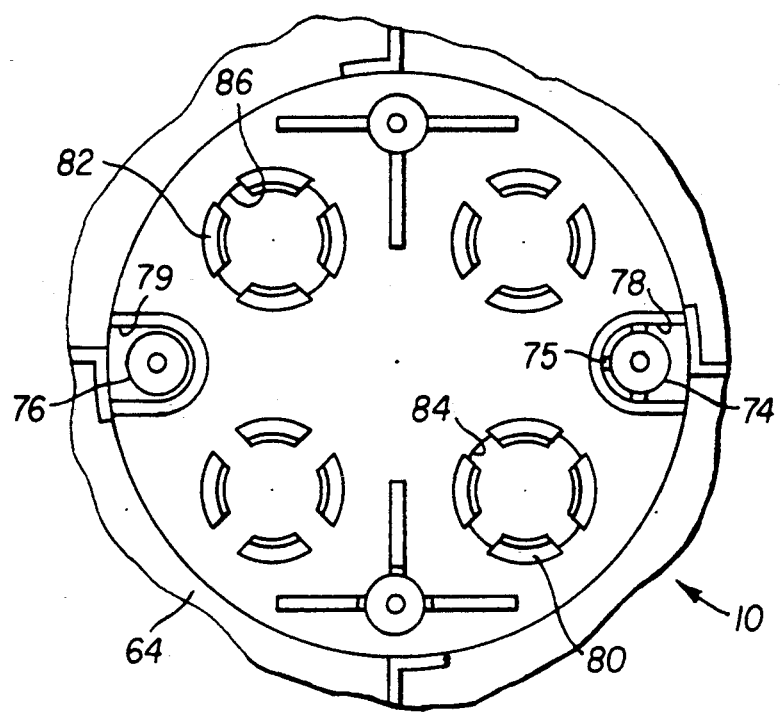
FIG. 9 is a top plan view of a center section of the cartridge magazine depicting structure for aligning adjacent magazine sections when two or more sections are stacked and coupled together.

The magazine may include a single layer, or an assembly of several sections 10 stacked one on top of another, as depicted in FIGS. 4 and 9. Two identical magazine sections 10 are illustrated, including interconnecting structure for coupling the sections together. The hub 66 is adapted for capture between four upstanding ribs 68, 70, 72 and 73, aligning the sections radially. Pins 74 and 76 are adapted for receipt in radial slots 78 and 79 (FIG. 9) to prevent relative rotational movement between the sections. One pin 74 includes ribs 75 for constraining, but not overconstraining, relative rotational movement between the sections 10. Bayonets 80 and 82 are adapted for receipt in collars 84 and 86. The ends of the bayonets include flexible extensions that snap into the collars to provide an axial force pulling the sections 10together. Although fasteners 88 are depicted (FIG. 4), in most applications, additional fasteners are not normally required. The magazine sections are aligned for stacking by rotating one of the sections ninety degrees relative to the other and pushing the sections toward each other until they snap together.

Figure 5:
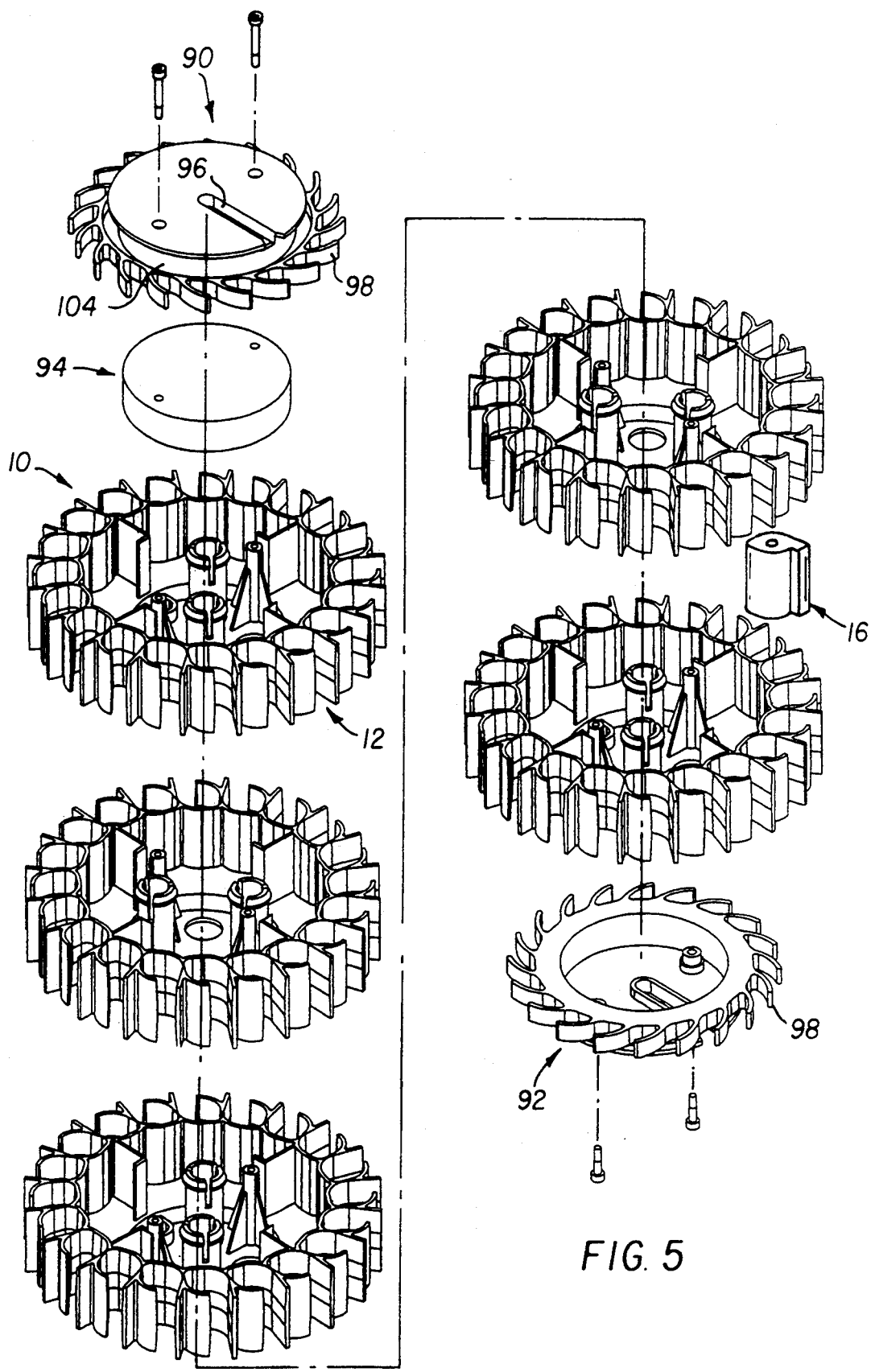
FIG. 5 is an exploded view of five magazine sections including opposed end caps.
Figures 6, 7:
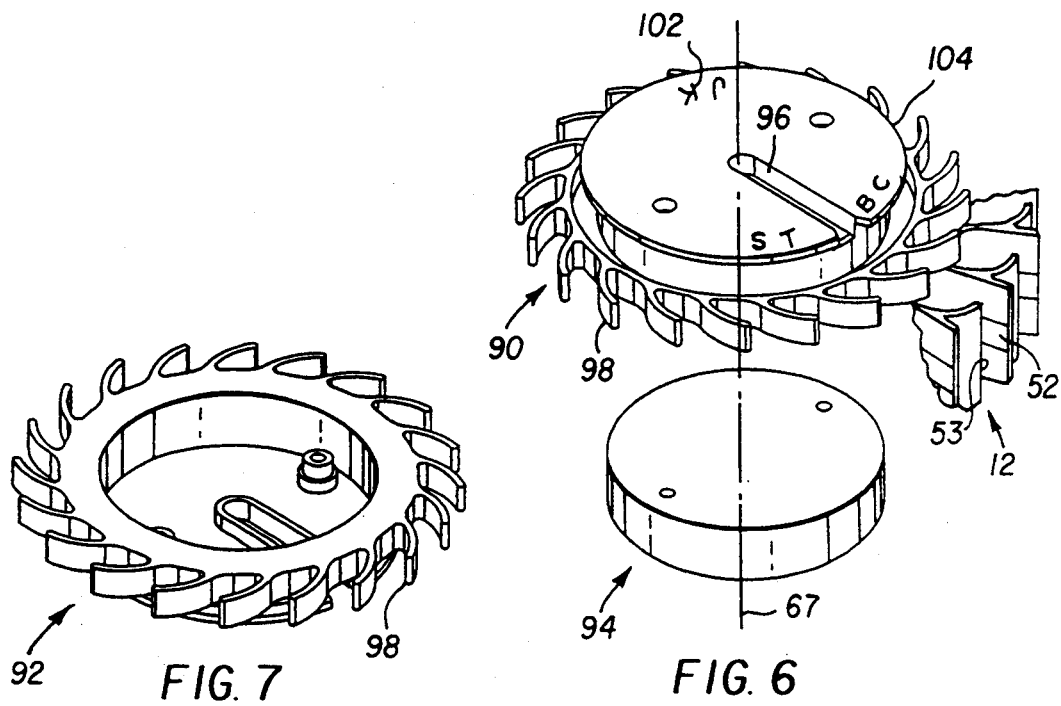
FIGS. 6 and 7 are perspective views of two substantially identical end caps, one from the top, including a spacer, and the other from the bottom without the spacer.

Referring now to FIGS. 5-7, end caps 90 and 92 are illustrated with an additional spacer 94. The additional spacer 94 has essentially the same configuration as the hub 66, and is attached to end cap 90 for locating the cap on the adjacent magazine section between the upstanding ribs 68, 70, 72 and 73. The end caps include a radial slot 96 that defines a home position for loading and unloading the magazine on associated equipment.

The slot 96 extends to the center of the caps 90 and 92 to permit rotation of the magazine on a pin engaging the slot at its center.

Figure 8:
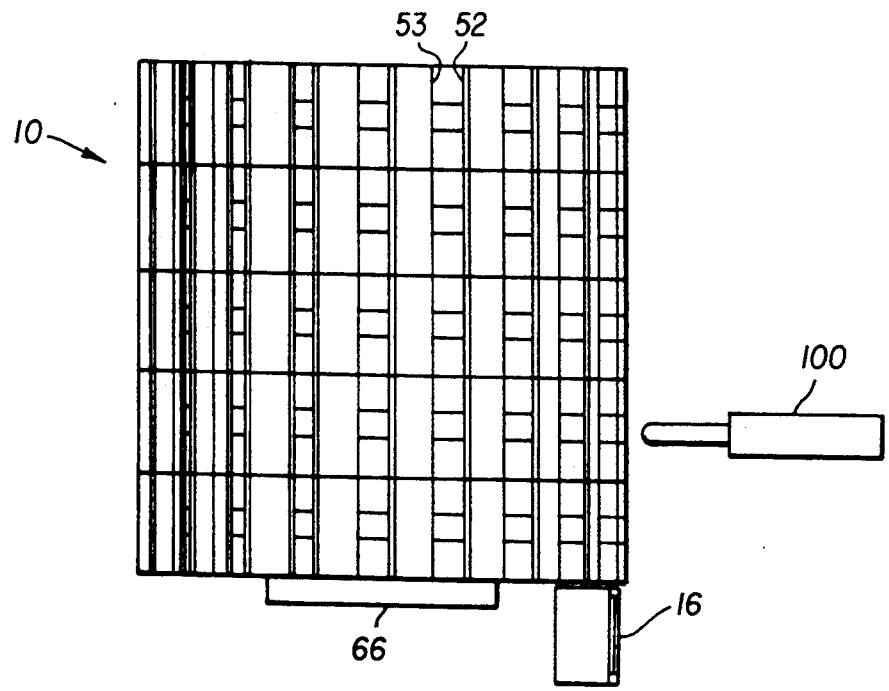
FIG. 8 is a side view of a magazine assembly corresponding to the assembly exploded in FIG. 5, with the end caps removed.

Flexible fingers 98 extend from the end caps to act as a gate partially blocking the ends of the sleeves. The fingers are moveable by flexing, either manually or with associated equipment, between a position blocking the sleeves for containing the cartridges, and a position opening the sleeves for loading or dispensing the cartridges. A cartridge escape mechanism 100 (FIG. 8) is depicted for releasing the cartridges one at a time when a selected one of the gates is open. Letters 102 are embossed in the end caps for identifying each sleeve. The end caps define journals 104 for rotatably supporting the magazines in associated equipment.

The sleeves 12 preferably are transparent, permitting manual and automated reading of information, such as a bar code and cartridge identification, on either or both sides of the cartridge snout 20. The close proximity to the cartridge of the surrounding magazine walls, and the thin wall construction, facilitates viewing of the cartridge with little distortion.

In one application of the magazine, it is assembled to include several sections 10 so the sleeves 12 define a plurality of columns as depicted in FIG. 5. The cartridges are loaded into the magazine at one end in sequential order to fill one column and then successively adjacent columns. The cartridges are maintained in sequential order in the magazine until retrieved some time later. Retrieval is from the opposite end in the same order, maintaining the original sequence. Alternatively, the sequence can be reversed by retrieving the cartridges from the same side they were loaded, starting with the last column and working back toward the first. The home position is identified by slot 96, while the magazine is supported by journals 104 of end caps 92 and 92. The magazine is rotated about its longitudinal axis to index the columns into position for loading and dispensing the cartridges.

In another application, the magazine is used to contain cartridges with film for presentation to various processing stations. Only one section 10 is used, similar to FIG. 1, but including end caps 92 and 94. The cartridges 16 in this application are arranged in a row instead of a column. The magazine is positioned on the equipment and rotated to present the cartridges 16 sequentially to one of the equipment stations. The respective cartridge in the station is then engaged by the equipment to extend the film from the cartridge for processing, through cartridge snout 20 and magazine slot 60. After processing is completed, the film is rewound back into the cartridge. Although the magazine is supported to establish the initial position and orientation of the cartridges 16, more precise positioning is provided by engagement with the processing equipment. The cartridges are accessible from both ends, and the final adjustment is permitted by the slightly loose fit between the cartridges and their containing sleeves. Although the magazine can be supported in either vertical or horizontal orientations, when the magazine is horizontal, the film is vertically oriented and provides substantial beam strength, tending to aid threading operations by maintaining the film in the same plane as the row of sleeves.

Still another application applies to consumers, who might use the magazine for storage. In this application, sections would be added to the magazine as the storage requirements increase.

While the invention has been described with reference to a preferred embodiment, it will be understood by those skilled in the art that the invention is not limited to the particular details of the embodiment illustrated. The claims are intended to cover all such modifications and applications that do not depart from the true spirit and scope of the invention.

PARTS LIST FOR FIGURES

| Reference No. | Part |
| --- | --- |
| 10. | Magazine section. |
| 12. | Sleeve. |
| 14. | Core. |
| 16. | Film cartridge. |
| 18. | Flattened cylindrical body. |
| 20. | Cartridge snout. |
| 22. | Straight wall. |
| 24. | Straight wall. |
| 26. | Straight wall. |
| 28. | Arcuate section. |
| 30. | Arcuate section. |
| 32. | Arcuate section. |
| 34. | Cartridge end. |
| 36. | Projection. |
| 37. | Projection. |
| 39. | Pocket. |
| 40. | Straight wall. |
| 42. | Straight wall. |
| 44. | Straight wall. |
| 46. | Arcuate section. |
| 48. | Arcuate section. |
| 50. | Arcuate section. |
| 52. | Projection. |
| 53. | Abutment. |
| 54. | One end of sleeve. |
| 56. | Opposite end of sleeve. |
| 58. | Draft angles. |
| 60. | Slot. |
| 64. | Web. |
| 66. | Outer hub. |
| 67. | Axis. |
| 68. | Upstanding rib. |
| 70. | Upstanding rib. |
| 72. | Upstanding rib. |
| 73. | Upstanding rib. |
| 74. | Pin. |
| 75. | Rib. |
| 76. | Pin. |
| 78. | Radial slot. |
| 79. | Radial slot. |
| 80. | Bayonet. |
| 82. | Bayonet. |
| 84. | Collar. |
| 86. | Collar. |
| 88. | Fastener. |
| 90. | End cap. |
| 92. | End cap. |
| 94. | Spacer. |
| 96. | Radial slot. |
| 98. | Flexible finger. |
| 100. | Escape mechanism. |
| 102. | Letter. |
| 104. | Journal. |

What is claimed is:

1. A cartridge magazine for containing a plurality of film cartridges; said magazine comprising:
    a plurality of sleeves, each sleeve defining a passageway open at both ends for containing at least one of the film cartridges between said open ends;
    a hub defining a center and supporting said plurality of sleeves parallel to one another in a ring about said center, wherein said passage ways define cross-sections for receiving and dispensing the film cartridges through said open ends; and a gate for selectively blocking and unblocking at least one of said open ends.

2. The cartridge magazine of claim 1, wherein said gate is a member moveable between a blocking position and a retracted position, said member in said blocking position extending over said at least one open end to prevent movement of the film cartridges from the sleeve, said member in said retracted position permitting movement of the film cartridges from the sleeve.

3. The invention of claim 2, wherein said member moves between said blocking and retracted positions by flexing of said member.

4. A cartridge magazine for containing a plurality of film cartridges; said magazine comprising:
 a structure of thin walls defining a plurality of sleeves interconnected in a ring of said sleeves, each sleeve defining a pocket sized for holding at least one of the film cartridges; and,
 a hub having a thin web for supporting said plurality of sleeves wherein the sleeve thin walls include transparent portions for viewing the cartridges held in said pocket.

5. The invention of claim 4, wherein said thin web extends substantially normal to said sleeves and includes a cylindrical disk displaced out of the plane of said web in the center of said ring.

6. The invention of claim 4, wherein said thin walls defining said sleeves include projections spaced equally around the outer periphery of the sleeve ring.

7. A magazine for handling a plurality of film cartridges having a non-circular cross-section; said magazine comprising:
 a plurality of sleeves, each sleeve defining a non-circular passageway accommodating longitudinal movement of the cartridges entirely through said passageway while blocking rotational movement of the cartridges in said passageway; and,
 a hub supporting said plurality of sleeves parallel to one another in a ring.

8. The invention of claim 7, wherein said passageway includes end sections and a central section between said end sections, and wherein said passageway defines cross sections that increase from said central section toward said end sections.

9. A cartridge magazine for handling a plurality of film cartridges, each cartridge having a body section for receiving the film and a snout including a film exit from the body section; said magazine comprising:
 a plurality of substantially identical sleeves, each sleeve defining a passageway extending entirely through the magazine for storing at least one of the cartridges, each sleeve having a cross-section for accommodating the cartridge snout and preventing rotation of the cartridge in the sleeve; and,
 a hub defining an axis for rotation and for supporting said plurality of sleeves parallel to the axis for rotation, wherein said each sleeve's cross-section is sized to allow receiving and dispensing of said at least one cartridge through said open ends.

10. The invention of claim 9, wherein each sleeve includes means defining a longitudinal slot extending through the sleeve and providing access to said passageway from the exterior of said magazine.

11. The invention of claim 10, wherein said cross-section captures the cartridge snout with the cartridge exit accessible through said slot.

12. The invention of claim 9, wherein said cross-section includes thin walls defining substantially straight sections and arcuate sections interconnecting said straight sections.

13. The invention of claim 9, wherein at least one of said sleeves includes means defining a longitudinal slot parallel to and facing away from the axis of rotation.

14. A cartridge magazine for handling a plurality of film cartridges, each cartridge having a flattened cylindrical body and a film conduit extending generally tangential from the body; said magazine comprising:
 a plurality of substantially identical elongate sleeves, each sleeve defining a passageway extending entirely through the magazine for storing at least one of the cartridges, each sleeve having a cross-section defining a flattened cylindrical section for accommodating the cartridge body and a non-cylindrical wall extending generally tangential from the flattened cylindrical section for accommodating the film conduit, said cross-section permitting longitudinal movement of the cartridges through said passageway and restricting rotational movement of the cartridges in the passageway; and,
 a hub supporting said sleeves substantially parallel.

15. The invention of claim 14, wherein said hub includes means for stacking a plurality of said magazines with their sleeves longitudinally aligned.

16. The invention of claim 15, wherein said stacking means includes interlocking surfaces and latches for securing said magazines together in a single predetermined orientation.

17. The invention of claim 15, wherein each sleeve includes means defining a longitudinal slot extending through the sleeve over its entire length for providing access to said passageway from the exterior of said magazine.

18. The invention of claim 17, wherein said slot is located adjacent said non-cylindrical wall for providing access to the cartridge conduit through said slot.

19. The invention of claim 17, wherein said magazine includes clear sections for viewing the cartridges through the magazine.

20. A magazine assembly for film cartridges comprising:
 a first row of parallel sleeves for containing the film cartridges;
 a second row of parallel sleeves for containing the film cartridges;
 means for coupling said first and second rows of sleeves in columns, wherein said first and second rows are arranged in first and second rings, respectively, having substantially the same diameter; and
 opposed end caps capturing the first and second rows of sleeves therebetween, and said caps include gating members aligned with columns for releasably blocking movement of said cartridges from said columns.

21. A cartridge magazine for positioning film cartridges in associated equipment comprising:
 a plurality of sleeves said sleeves defining a passageway open at both ends for receiving the cartridges;
 a hub defining an axis of rotation and supporting said sleeves at the same predetermined radius from the axis parallel to the axis;
 said sleeves having a configuration for confining the cartridges with play between said sleeves and the cartridges, thereby permitting final positioning of the cartridges by the associated equipment without removing the cartridges from said sleeves, said sleeves being further defined by cross-section for receiving and dispensing said cartridges, said magazine including a gate for selectively blocking and unblocking at least one of said open ends.

22. A cartridge magazine for containing a plurality of film cartridges and having a plurality of passageways arranged circumferentially about a structure having a central hub, each said passageway being sized for supporting at least one film cartridge and for preventing rotation of said cartridge, wherein each said passageway is defined by a pair of open ends for receiving and dispensing of said at least one cartridge therethrough.

* * * * *